United States Patent [19]

Fujita

[11] 3,757,034

[45] Sept. 4, 1973

[54] COLOR VIDEO SIGNAL RECORDING AND REPRODUCING SYSTEM

[75] Inventor: Mitsuo Fujita, Tokyo, Japan

[73] Assignee: Victor Company of Japan, Ltd., Yokohama-City, Kanagawa-Ken, Japan

[22] Filed: Jan. 12, 1972

[21] Appl. No.: 217,175

[30] Foreign Application Priority Data

Jan. 16, 1971 Japan .................................. 46/973
Jan. 22, 1971 Japan ................................ 46/1841

[52] U.S. Cl. ........................................... 178/5.4 CD
[51] Int. Cl. .......................... H04n 5/78, H04n 9/38
[58] Field of Search .............................. 178/5.4 CD

[56] References Cited

UNITED STATES PATENTS

| | | | |
|---|---|---|---|
| 3,626,087 | 12/1971 | Tomioka | 178/5.4 CD |
| 3,629,491 | 12/1971 | Dann | 178/5.4 CD |
| 3,681,518 | 8/1972 | Hidaka | 178/5.4 CD |

*Primary Examiner*—Howard W. Britton
*Attorney*—Louis Bernat

[57] ABSTRACT

In a color video signal recording and reproducing system, a color video signal is separated into a luminance signal and a carrier chrominance signal. The luminance signal is frequency modulated, while the carrier chrominance signal is frequency converted to a lower frequency band. The frequency modulated luminance signal and the frequency converted carrier chrominance signal are superimposed one upon the other, and the superimposed signal is recorded on and reproduced from a magnetic medium. The frequency modulated luminance signal is separated from the reproduced signal and then demodulated. The frequency converted carrier chrominance signal is also separated from the reproduced signal and then reconverted to its original frequency band. A feedback loop, including a voltage control oscillator, extends from the output of the frequency converter means for reconverting the carrier chrominance signal and terminates at the second frequency converter means. The central oscillation frequency of the voltage control oscillator is sufficiently low so that the feedback loop is not substantially unlocked by frequency drifting caused by ordinary changes in ambient temperature.

8 Claims, 4 Drawing Figures

COLOR VIDEO SIGNAL RECORDING AND REPRODUCING SYSTEM

This invention relates to a color video signal recording and reproducing system, and more particularly to systems for recording and reproducing color video signals without setting loose the so-called "color lock" in a video tape recorder having a comparatively narrow frequency band.

Generally, color video signal recording and reproducing systems are classified into (1) systems wherein the luminance signal and chrominance signal of a composite color video signal are recorded in and reproduced from separate tracks on a magnetic medium, and (2) systems wherein the color video signal is frequency modulated for recording and reproduction.

The first system, however, has an essential disadvantage since it uses twice as much magnetic medium as compared to systems in which the luminance and chrominance signals are combined when recorded. The second system also has a a disadvantage when applied to a relatively simple type video tape recorder (hereinafter referred to as a "VTR" apparatus), because then it tends to give rise to beats which, in turn, cause moires which considerably degrade the quality of the reproduced pictures. When this second system is adapted for a color TV broadcasting VTR apparatus, the so-called "high band system" is employed in an attempt to prevent the production of beats. The FM carrier wave used in this high band system has a higher frequency than that of the "low band system." However, in the simple type VTR for industrial or household use, the relative speed between the magnetic tape and the magnetic head is lower than the speed in the VTR for commercial broadcasting use. Also, the frequency of the FM carrier wave can not be rendered sufficiently high. Therefore, when the system is adapted for such simple type VTRs, excessive beats are often caused by the FM carrier wave and chrominance subcarrier.

The following factors are usually responsible for the production of beats. (1) There is leaking of the frequency modulated component through the frequency modulator. (2) There is leaking of the frequency modulated component through the frequency demodulator. (3) There is a folded spectrum in the second sideband, with respect to the chrominance subcarrier. (4) There is a non-linear characteristic of the low carrier wave FM transmission system. Of these factors, the fourth factor is almost inevitable in a magnetic recording and reproducing system. It is responsible for the beats produced during the process of operation of the magnetic tape. Thus, it is impossible to wholly eliminate the beats of this type. However, it is not impossible to eliminate the beats caused by the factors (1) to (3) since they result from low carrier wave frequency modulation of video signals comprising carrier chrominance signals.

The above described defects of the prior art systems are successfully overcome by the system of this invention. On its recording side, a luminance signal is separated from a color video signal and frequency modulated. A carrier chrominance signal is frequency converted. Then, the frequency modulated luminance signal and the frequency converted carrier chrominance signal are mixed or added together and recorded on a magnetic medium.

On a reproducing side, on the other hand, the phase of a burst signal is separated from a reprouced carrier chrominance signal and compared with the phase of a reference signal having a stable frequency. The output of this phase comparison means is used for controlling the oscillation frequency of a voltage control oscillator. The output from this voltage control oscillator is fed back to a frequency converter adapted for converting the frequency of the reproduced carrier chrominance signal to the original frequency band, thereby eliminating variations that may be included in the time axis of the reproduced carrier chrominance signal.

However, the operation of the voltage control oscillator in general is greatly affected by changes in ambient temperature. A temperature change of from about 0°C to 60°C, for example, will cause a drift of ± about 0.15 per cent in the center frequency of oscillation. Even those voltage control oscillators which have been manufactured with sufficient attention to the quality of their parts are subject, with the lapse of time, to a drift of about ± 0.1 per cent in their center frequency of oscillation. Such drifting in the center frequency, whether caused by temperature change or the lapse of time, results in an unlocking of the color lock of an automatic color phase control loop.

Accordingly, the present invention gives a comparatively low center frequency of oscillation to the voltage control oscillator used in the color phase control loop. In this manner, the drift caused by the ambient temperature change, and other factors controlling the center frequency of oscillation, does not substantially affect the color lock, because the absolute value of the frequency drift is kept suitably low.

It is a general object of the present invention to provide a novel and useful color video signal recording and reproducing system, altogether free from the listed disadvantages of the prior art system.

Another object of the invention is to provide a color video signal recording and reproducing system wherein only the luminance signal of a composite color video signal is frequency modulated, recorded, and reproduced in the form of an FM wave, whereas the carrier chrominance signal is frequency converted, directly recorded, and reproduced in the form of a frequency converted direct wave. The reproduced FM wave is demodulated into the original luminance signal, while the reproduced frequency converted wave is frequency converted back into the original carrier chrominance signal.

In this system, the effects of beat disturbance, which is characteristic of a low carrier frequency demodulation system, are minimized because the carrier chrominance signal does not pass through a low carrier frequency modulation and demodulation system. It is also possible to compensate for considerable variations in the time axis of the reproduced carrier chrominance signal that are caused by fluctuations in the running speed of magnetic tape. Further this system minimizes differential gain (DG) and differential phase (DP) by separating the carrier chrominance signal from the luminance signal.

A further object of the invention is to provide a color video signal recording and reproducing system wherein the center frequency of oscillation of a voltage control oscillator, for use in the above described frequency conversion on the reproducing side of the system, is made suitably low. In this manner, even though the center frequency of oscillation may drift due to a change in ambient temperature, the absolute value of the frequency drift is small. Therefore, according to the system of the present invention, even though there are changes in ambient temperature, the color lock is not caused to unlock.

A still further object of the invention is to provide a color video signal recording and reproducing system wherein a horizontal synchronizing signal, obtained from the demodulated luminance signal, is utilized for correcting of the carrier chrominance signal. This correction is made by multiplying the frequency of the horizontal synchronizing signal up to approximately one half the frequency of the carrier chrominance signal which has been converted to a comparatively low frequency band. In this manner, the production of jitters, likely to occur upon a "dubbing" of the signal reproduced by one VTR apparatus onto another VTR apparatus, is minimized.

The novel features which are considered as being characteristic of the system of this invention are set forth with particularity in the appended claims. The invention itself, however, together with additional objects and advantages thereof, will be best understood from the following description when taken in conjunction with the accompanying drawings, in which:

Figure 1:
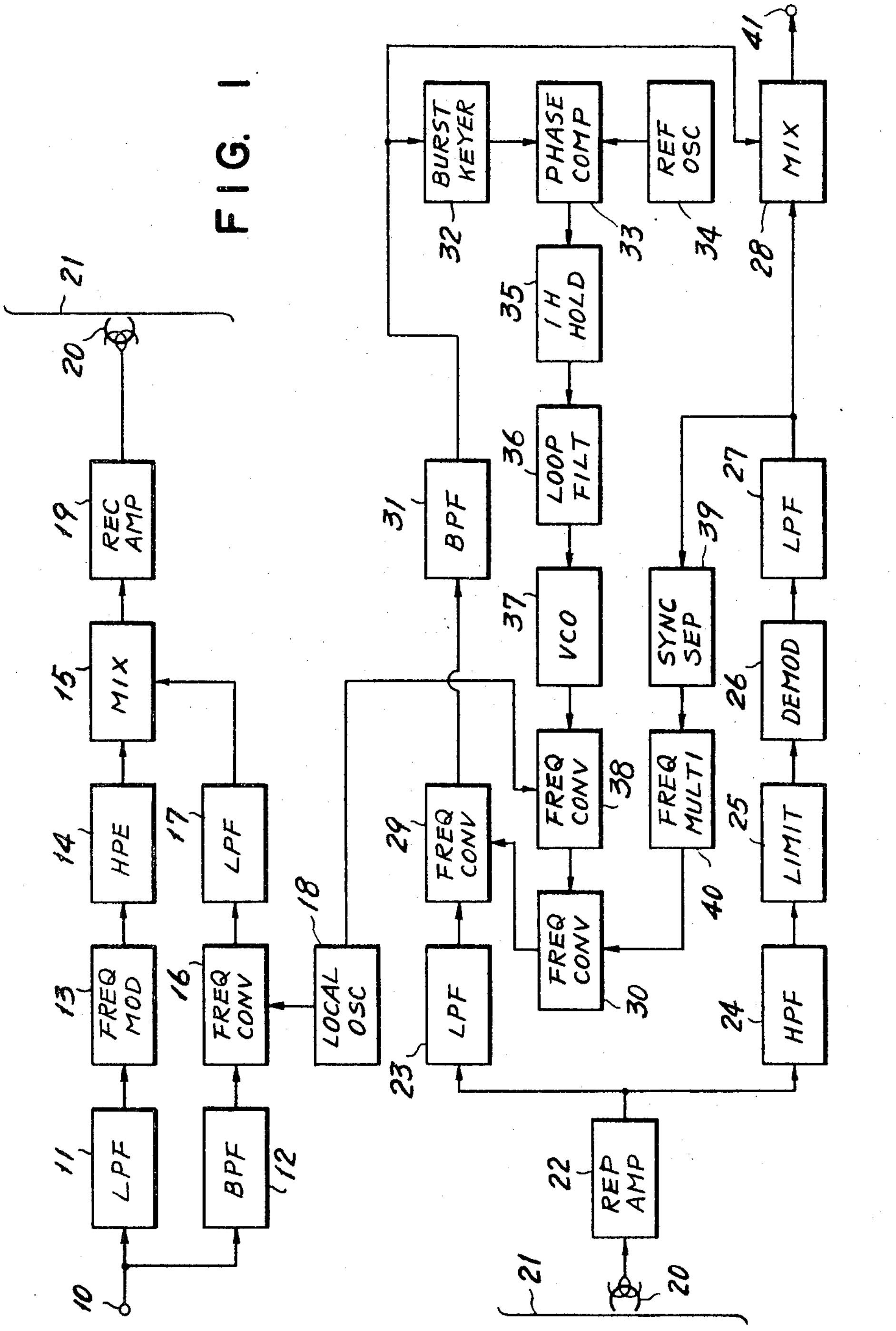
FIG. 1 is a block diagram of a recording side and a reproducing side of a color video signal recording and a reproducing system according to the present invention, illustrated purely by way of a preferred embodiment thereof.

The exemplified form of the recording and the reproducing sides of the system of the invention illustrated in FIG. 1 will now be explained. On the recording side, an NTSC system color video signal is applied through an input terminal 10 to a low-pass filter 11 having an upper limit frequency of 3 MHz. The same input signal is also applied to a bandpass filter 12 which passes a frequency band of 3.1 to 4.1 MHz.

A luminance signal, on the one hand, is separated from the color video signal at the low-pass filter 11 and thereafter is frequency modulated at a frequency modulator 13. The frequency deviation in this instance is selected to be in the range from about 3.8 to 5.4 MHz. The output from the frequency modulator 13 is applied to a high-pass filter 14, which removes therefrom the sidebands of less than about 1.2 MHz. The frequency modulated luminance signal is then applied to a mixer 15.

On the other hand, a carrier chrominance signal is separated from the incoming color video signal at the bandpass filter 12. Then it is applied to a frequency converter 16, where the carrier chrominance signal with a frequency of 3.579545 MHz (hereinafter stated more simply as 3.58 MHz) is frequency converted by the output signal of a local oscillator 18 and is hence "beaten down." The local oscillator 18, which may be a crystal oscillator, supplies a frequency of a stable 4.267919 MHz (hereinafter stated more simply as 4.268 MHz). The signal which has been converted at the frequency converter 16 is a difference frequency (i.e. about 688 KHz) between the aforesaid 4.268 MHz and 3.58 MHz frequencies. The difference frequency has its unnecessary components removed at a low-pass filter 17 having an upper limit frequency of 1.2 MHz. The frequency converted carrier chrominance signal is then applied to the mixer 15.

In this mixer 15, the frequency modulated luminance signal from the high-pass filter 14 and the frequency converted carrier chrominance signal from the low-pass filter 17 are mixed together or superposed one upon the other, in such a manner that their bands will not overlap. The signal produced by this superposition is then amplified at a recording amplifier 19 and is then applied, for example, to a rotary recording and reproducing magnetic head 20. The signal is thus recorded on a running magnetic tape 21 by the rotary magnetic head 20 in the conventional method.

As regards the selection of the oscillating frequency of the aforesaid local oscillator 18, the detailed description is given in U.S. Pat. application Ser. No. 88,350, entitled "Color Video Signal Recording and Reproducing System," and filed Nov. 10, 1970 by the present applicant as the Continuation-In-Part application of the preceding application Ser. No. 12,301.

If the repetition frequency of a horizontal synchronizing signal is fH, the frequencies corresponding to the odd-numbered multiple of fH/2 are comparatively inconspicuous since they are cancelled between the horizontal scanning lines. As a consequence, the beat disturbance due to the third distortion components and the like will be rendered least conspicuous in case the frequency $fo$ of the frequency converted carrier chrominance signal is selected to be: $fH/4 \times (2n + 1)$. For this purpose, the frequency of oscillation $fe$, produced by the local oscillator 18, must be: $fs + fH/4 \times (2n + 1)$, where $fs$ denotes the chrominance subcarrier frequency. Since this frequency $fs$ is set to $(5 \times 7 \times 13)/2$ fH, the frequency of oscillation $fe$, of the local oscillator 18 must satisfy the relation, $fe = (5 \times 7 \times 13/2 + 2n + 1/4)fH$. From the considerations set forth in the preceding paragraph, the frequencies $fe$ and $fo$ are respectively determined as follows in this particular embodiment of the invention: $fe$ = 4.267919 MHz, and $fo$ = 688.374 KHz.

On the reproducing side, the signal recorded on the magnetic tape 21, as previously described, is reproduced by the magnetic head 20. The reproduced signal is amplified at a reproducing amplifier 22 and is supplied both to a low-pass filter 23 having an upper limit frequency of 1.2 MHz and to a high-pass filter 24 having a lower limit frequency of 1.2 MHz.

The frequency modulated luminance signal, on the one hand, is separated at the high-pass filter 24 and is limited in amplitude at a limiter 25. The frequency modulated signal is then demodulated at a frequency demodulator 26. The frequency modulated carrier wave components are removed at a low-pass filter 27 having an upper limit frequency of 3 MHz, and only the luminance component of the signal is taken therefrom. The output from the low-pass filter 27 is supplied both to a mixer 28 and to a synchronizing signal separator 39.

On the other hand, the carrier chrominance signal having a frequency of 688 KHz, separated at the low-pass filter 23, is supplied to a frequency converter 29, where the signal is frequency converted, or "beaten up," by the 4.268 MHz output frequency of a frequency converter 30, hereinafter described in detail. The original carrier chrominance signal which has the carrier wave of the original 3.58 MHz is thus obtained. The output from the frequency converter 29 has its undesired components removed at a bandpass filter 31, which passes a frequency band of 3.1 to 4.1 MHz. The output is thereafter supplied to both the mixer 28 and a burst keyer 32.

A color burst signal is separated from the carrier chrominance signal at the burst keyer 32 and is supplied to a phase comparator 33. Where the phase of the color burst signal is compared with the phase of the output signal, which has a frequency of 3.58 MHz, of a reference subcarrier frequency oscillator 34. The output voltage of the phase comparator 33, represents a detected phase error. Since this output is produced only during each burst period, this output voltage is applied to a one horizontal scanning period holding circuit 35 where it is held during each one horizontal scanning period. The voltage of the detected phase error is thence applied through a loop filter 36 to a voltage control oscillator 37, as a control voltage.

Let it now be assumed that the center frequency of oscillation of the voltage control oscillator 37 is 4.268 MHz, and that its output frequency is directly applied to the frequency converter 29. It is known that voltage control oscillators in general suffer from frequency drifts of ± 0.15 per cent or thereabouts due to the ambient temperature change in the range of from about 0° to 60°C. Therefore, if the center frequency of oscillation is 4.268 MHz, as above assumed, frequency drifts of ± about 6.4 KHz are inevitable. In the conventional system, the color lock will then be unlocked and loosened.

According to the present invention, the center frequency of oscillation of the voltage control oscillator 37 is made sufficiently low. Even if frequency drifts of ± about 0.15 per cent occur in the voltage control oscillator, the absolute values of such frequency drifts are so small that the color lock remains substantially unaffected. In this particular embodiment of the invention, the center frequency of oscillation of the voltage control oscillator 37 is set to 708 KHz, so that frequency drifts, if any, will take place only up to ± about 1 KHz.

The 708 KHz output frequency of the voltage control oscillator 37 is applied to a frequency converter 38, where the incoming frequency is converted to that of 3.56 MHz responsive to the stable 4.268 MHz frequency signal supplied from the aforesaid local oscillator 18. The 3.56 MHz output frequency of this frequency converter 38 is then applied to the other frequency converter 30.

The luminance signal from the low-pass filter 27 is applied to the synchronizing signal separator 39, as aforesaid, where the horizontal synchronizing signal of 15.75 KHz is separated therefrom. The thus-separated horizontal synchronizing signal is multiplied 5 × 3 × 3 (= 45) times at a frequency multiplier 40. The output signal of this frequency multiplier 40, which has a frequency of about 708 KHz, is applied to the frequency converter 30.

In this frequency converter 30, the conversion is effected between the 3.56 MHz frequency from the frequency converter 38 and the 708 KHz frequency from the frequency multiplier 40. Conversion is in such a manner that an output frequency of about 4.268 MHz is produced therefrom. This 4.268 MHz output frequency signal of the frequency converter 30 is applied to the frequency converter 29, as previously mentioned, in order to convert or "beat up" the frequency of the carrier chrominance signal.

In the present embodiment of the invention, the center frequency of oscillation of the voltage control oscillator 37 is set to 708 KHz, as aforesaid, so that a frequency drift in the range of ± about 0.15 per cent caused by a change in ambient temperature, for instance, actually entails a drift of only about 1 KHz. This frequency drift is as small as about one sixth the frequency drift. Such conventional drift may be caused in the center frequency of oscillation of the voltage control oscillator 37 when its output is applied directly to the frequency converter 29, as above assumed. The color lock is thus kept in the locked state since the drift in the center frequency of oscillation of the voltage control oscillator 37 exerts hardly any effect upon the automatic phase control circuit.

Hence, as the carrier chrominance signal from the bandpass filter 31 and the luminance signal from the low-pass filter 27 are mixed together or superposed one upon the other in the mixer 28, a faithfully reproduced NTSC color video signal is obtained from an output terminal 41. It will be understood that the NTSC color video signal reproduced in this manner is highly stabilized, with its color lock now released and without substantially any variations in its time axis.

Figure 2:
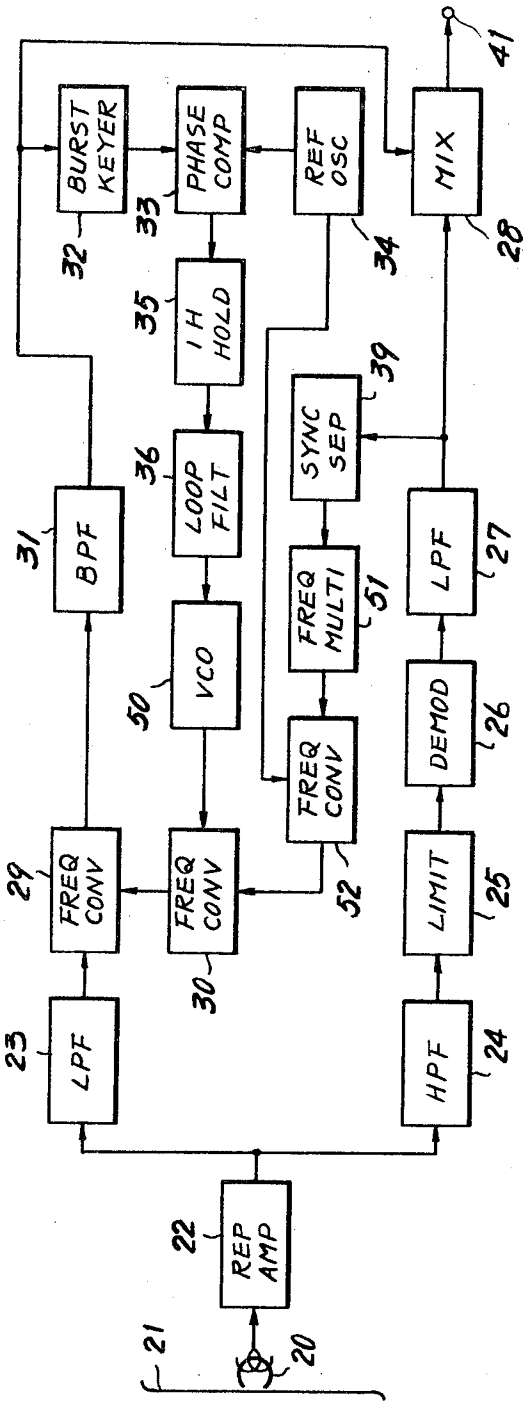
FIG. 2 is a block diagram of a second embodiment of the reproducing side of the system according to this invention.

The second embodiment of the reproducing side of the system according to this invention will now be described in relation with FIG. 2, in which parts similar to those shown in FIG. 1 are designated by the same reference numerals. No further explanation of such parts will be given in the following description.

A voltage control oscillator 50, corresponding to the voltage control oscillator 37 in the first embodiment of the invention shown in FIG. 1, has its center frequency of oscillation set at 295 KHz. The horizontal synchronizing signal separated at the synchronizing signal separator 39 (as previously mentioned) is multiplied 25 times at a frequency multiplier 51, to provide a resultant frequency of about 393 KHz. This 393 KHz frequency signal from the frequency multiplier 51 is frequency converted at a frequency converter 52 by the 3.58 MHz frequency signal supplied from the reference subcarrier frequency oscillator 34. The circuits react in such a manner that a frequency of 3.973 MHz is now obtained.

The 295 KHz oscillation frequency generated by the voltage control oscillator 50 is applied to the frequency converter 30. There, it is converted into a 4.268 MHz frequency responsive the 3.973 MHz frequency supplied from the frequency converter 52. The 688 KHz carrier chrominance signal from the low-pass filter 23 is, as in the first embodiment, frequency converted at the frequency converter 29 by the 4.268 MHz frequency signal from the frequency converter 30 and is thus "beaten up" to the original frequency.

In the first embodiment, the horizontal synchronizing signal is multiplied at the frequency multiplier 40 up to a frequency (708 KHz) close to the frequency (688 KHz) of the frequency converted carrier chrominance signal. It should be noted that the horizontal synchronizing signal is multiplied at the frequency multiplier 51 only up to a frequency (393 KHz) approximately one half the subcarrier frequency of the frequency converted carrier chrominance signal, in this second embodiment of the invention.

Let us now consider the so-called "dubbing" operation. A color video signal reproduced from a magnetic medium in one VTR is recorded onto a magnetic medium in another VTR. If the jitters of the first VTR and the second VTR are J1 and J2, respectively, the overall jitter of the horizontal synchronizing signal of the second VTR, after the dubbing operation, will be (J1 + J2) in. In the system of the first embodiment, the frequency of the horizontal synchronizing signal is multiplied up to a frequency close to the subcarrier frequency of the frequency converted carrier chrominance signal. The jitter of the carrier chrominance signal will then be J2. Accordingly, if the multiplied frequency of the horizontal synchronizing signal is applied to the frequency converter in the automatic phase control loop, the jitter of the carrier chrominance signal will be : (J1 + J2) − J2 = J1. The jitter J1 of the first VTR thus remains.

On the contrary, in this second embodiment of the invention, wherein the frequency multiplier 51 multiplies the frequency of the horizontal synchronizing signal only up to about one half the subcarrier frequency of the frequency converted carrier chrominance signal. This this multiplied frequency is utilized for the frequency conversion. The result is that the multiplied frequency modifies the jitter of the carrier chrominance signal by (J1 + J2/2). Hence, the jitter of the carrier chrominance signal after the dubbing operation will be: (J1 + J2/2) − J2 = (J1 − J2/2). The jitter (J1 − J2/2) thus remains.

The jitters J1 and J2 each represents a certain distribution of probabilities. According to the known theorem of probability, the probability that (J1 − J2/2) is smaller than J1 is greater than the opposite probability. It is, therefore, concluded that the jitter, produced responsive to dubbing is less pronounced in this second embodiment than in the first embodiment shown in FIG. 1. The color video signal recording and reproducing system based upon this second embodiment of the invention may be considered as being most preferable for use in the dubbing operation of the color video signals.

Figure 3:
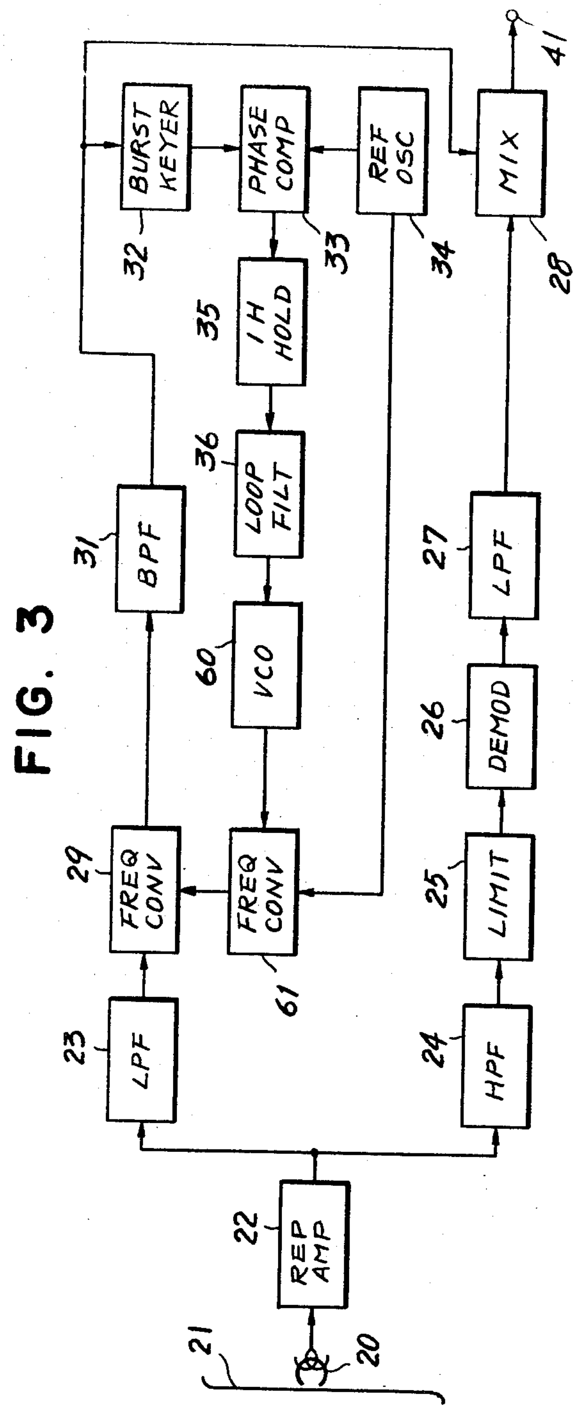
FIG. 3 is a block diagram of a third embodiment of the reproducing side of the system according to this invention.

FIG. 3 illustrates the third embodiment of the reproducing side of the system of this invention. Reference numerals used in common in FIGS. 1 and 3 denote like parts, and such parts will not be explained any further.

The center frequency of oscillation of a voltage control oscillator 60 is selected to 688 KHz. The voltage control oscillator 60 is supplied with the output from the phase comparator 33 via the one horizontal scanning period holding circuit 35 and the loop filter 36. This 688 KHz output frequency of the voltage control oscillator 60 is applied to a frequency converter 61, to be converted into a frequency of 4.268 MHz responsive to the 3.58 MHz frequency signal supplied from the reference subcarrier oscillator 34.

The frequency converted carrier chrominance signal, with the frequency of 688 KHz, from the low-pass filter 23 is, as in the preceding embodiments, frequency converted at the frequency converter 29 by the 4.268 MHz frequency signal from the frequency converter 61 and is thus "beaten up" to the original frequency.

This third embodiment of the invention is, perhaps, not suited for VTRs having comparatively large fluctuations in the running speed of the magnetic tape. This embodiment does not attempt to make a modification effort responsive to the horizontal synchronizing signal, as is done in the first and second embodiments. However, this third embodiment is most suitable for VTRs having little fluctuations in tape speed, and it has an advantage since it has a simplified circuit configuration.

Figure 4:
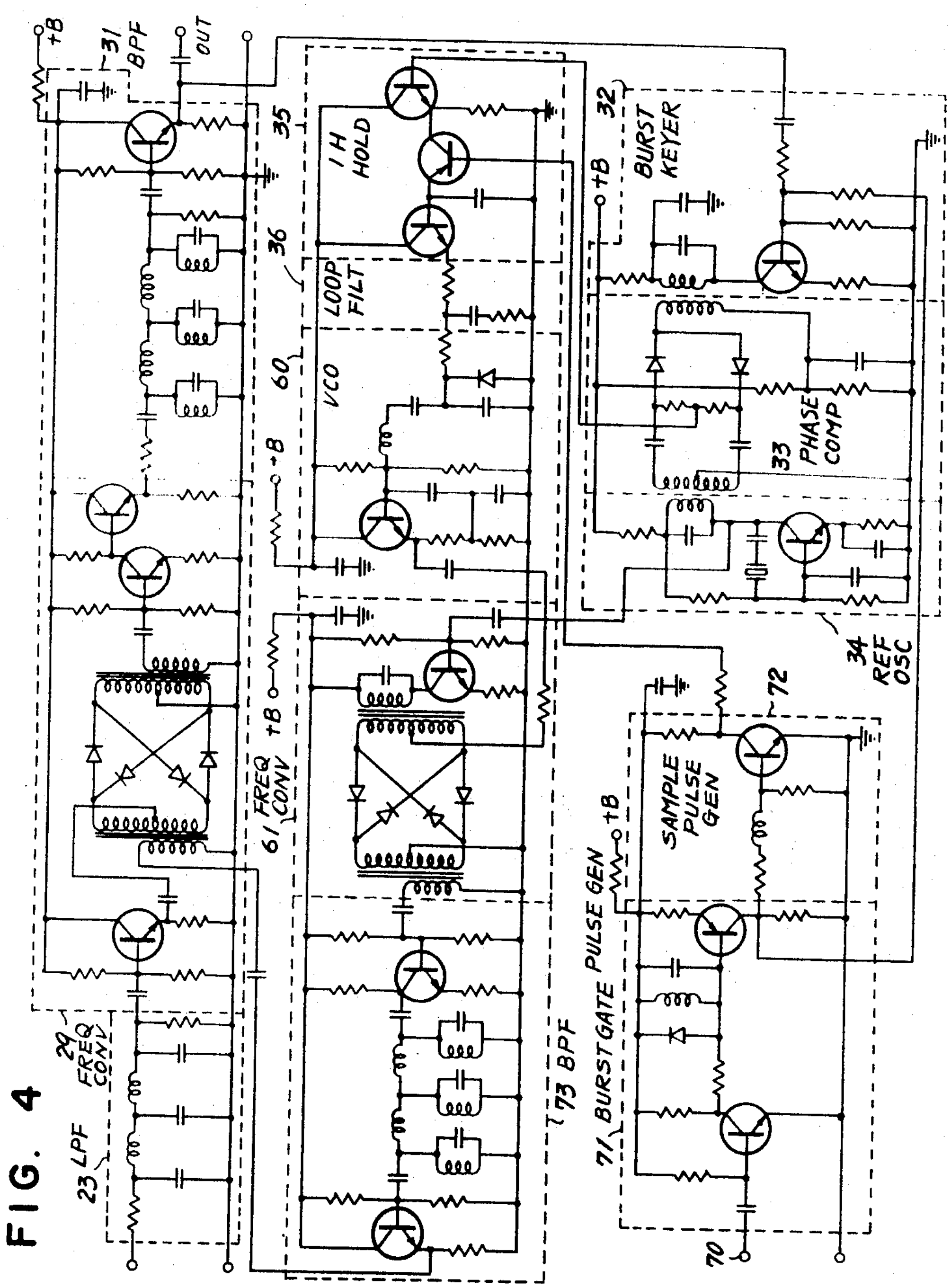
FIG. 4 is a circuit diagram showing in detail an embodiment of electric circuit of the block diagram shown in FIG. 3.

FIG. 4 illustrates an embodiment of the electronic circuits for essential parts of the third embodiment shown in FIG. 3. The circuit for the parts relating to the frequency modulated luminance signal are not shown in the drawing. In FIG. 4, the parts similar to those shown in FIG. 3 are surrounded by the dashed lines and designated by like reference numerals. Description will be given hereinbelow only for those parts which are not fully disclosed in the block diagram of FIG. 3.

The horizontal synchronizing signal is supplied through an input terminal 70 to a burst gate pulse generator 71. This burst gate pulse generator 71 supplies its burst gate pulses, on the one hand, to the burst keyer 32 for a separation of the desired burst signal. On the other hand, it is also supplied to a sample pulse generator 72. Sample pulses from this sample pulse generator 72 are applied to the one horizontal scanning period holding circuit 35, which is in fact a sample holding circuit. This circuit holds the output from the phase comparator 33 for each one horizontal scanning period. The output from the frequency converter 61 is applied to the frequency converter 29 through a bandpass filter 73.

Although the color video signal recording and reproducing system of the present invention has been shown and described hereinbefore in terms of several preferred embodiments thereof, the invention, itself, is not considered to be restricted by the exact showing of the drawings and the description thereof. The invention should be understood to include a latitude of modification, substitution, and change. Therefore, the appended claims be constructed to include all equivalents consistent with the spirit and scope of the invention herein disclosed.

What I claim is:

1. A color video signal recording and reproducing system comprising first filtering means for separating a luminance signal from a color video signal, means for frequency modulating said separated luminance signal, second filtering means for separating a carrier chrominance signal from said color video signal, means comprising a source of reference signals, first frequency converting means for converting the separated frequency band of said carrier chrominance signal to a lower frequency band responsive to a reference signal, means for mixing the output from said frequency modulating means and the output from said first frequency converting means, means for recording and thereafter reproducing the mixed signal on a magnetic medium, third filtering means for separating the frequency modulated luminance signal from a signal reproduced by said reproducing means, means for demodulating the separated luminance signal, fourth filtering means for separating the frequency converted carrier chrominance signal from said signal reproduced by said reproducing means, second frequency converting means for frequency converting and restoring the separated frequency band of the carrier chrominance signal to the original frequency band, means for separating a color burst signal from the output signal of said second frequency converting means, oscillating means for producing a reference subcarrier frequency signal, means for comparing the phase of said color burst signal with the phase of the output signal of said oscillating means, means including a voltage controlled oscillator having a center oscillation frequency controlled responsive to the output from said phase comparing means, third frequency converting means for converting the output frequency of said voltage controlled oscillator into a frequency applied to said second frequency converting means, means for providing a reproduced color video signal by mixing the output from said demodulating means and the output from said second frequency converting means, wherein a feedback loop terminating at said second frequency converting means is formed by said second frequency converting means, said color burst signal separating means, said phase comparing means, said voltage controlled oscillator, and said third frequency converting means, and means for setting the center frequency of oscillation of said voltage controlled oscillator at a sufficiently low level for locking said feedback loop despite frequency drifting caused by ordinary changes in ambient temperature.

2. The color video signal recording and reproducing system as defined in claim 1, in which said third frequency converting means includes a frequency converter coupled to the output of said voltage controlled oscillator and to the output of said oscillating means, said frequency converter converting the low to output center frequency of oscillation of said voltage control oscillator to a higher frequency which is applied t said second frequency converting means by means of the reference subcarrier signal from said oscillating means.

3. The color video signal recording and reproducing system as defined in claim 1, in which said first frequency converting means converts the frequency of said carrier chrominance signal into a frequency band which is lower than the frequency band of said frequency modulated luminance signal, and the center frequency of oscillation of said voltage controlled oscillator being substantially the subcarrier frequency of said frequency converted carrier chrominance signal.

4. The color video signal recording and reproducing system as defined in claim 1, which further comprises means for separating a horizontal synchronizing signal from the luminance signal produced by said demodulating means, means for multiplying the frequency of said horizontal synchronizing signal separated by said separating means, and means whereby said third frequency converting means is supplied with the output from said voltage controlled oscillator and with the output from said frequency multiplying means to convert the low level output center frequency of oscillation to a higher frequency which is applied to said second frequency converting means by means of the multiplied frequency of said horizontal synchronizing signal supplied from said frequency multiplying means.

5. The color video signal recording and reproducing system as defined in claim 4, in which said third frequency converting means includes a first frequency converter coupled to the output of said voltage controlled oscillator operated responsive to the same reference signal that is used in said first frequency converting means, said third frequency converting means converting the low level output center frequency of oscillation into a higher frequency responsive to said reference signal, and second frequency converter means coupled to the output of said first frequency converter and operated responsive to the output of said frequency multiplying means to convert the frequency of the output signal of said first frequency converter into a frequency applied to said second frequency converting means.

6. The color video signal recording and reproducing system as defined in claim 4, in which said third frequency converting means includes a first frequency converter coupled to the output of said frequency multiplying means and operated responsive to the output from said oscillating means to convert the multiplied output frequency of said multiplying means into a higher frequency, and second frequency converter means coupled to the output of said voltage controlled oscillator and operated responsive to the output of said first frequency converter to convert the low level output center frequency of oscillation of said voltage controlled oscillator into a higher frequency applied to said second frequency converting means.

7. The color video signal recording and reproducing system as defined in claim 6, in which said first frequency converting means is adapted to convert the frequency of said carrier chrominance signal into a frequency band which is lower than the frequency band of said frequency modulated luminance signal, and said frequency multiplying means multiplying the frequency of said horizontal synchronizing signal to approximately one half the subcarrier frequency of said frequency converted carrier chrominance signal.

8. A color video signal recording and reproducing system comprising first separating means for separating luminance signals and carrier chrominance signals from video signals, first converter means for frequency converting the carrier chrominance signals to a lower frequency band, means for superimposing the luminance signals and the frequency converted chrominance signals, means for recording and reproducing the superimposed signals, second separating means for separating luminance signals and the frequency converted chrominance signals from the superimposed signals, reconverting means for reconverting the frequency converted chrominance signals to the original frequency band of the carrier chrominance signals, a feedback loop extending from the output of said reconverting means and terminating at said reconverting means, said feedback loop including a voltage controlled oscillator having a center oscillation frequency which is controlled responsive to a voltage corresponding to phase shifts of the color burst signals included in said carrier chrominance signals, wherein the center oscillation frequency of the voltage controlled oscillator is held at a low level which maintains the feedback loop in a substantially locked condition despite any frequency drift caused by changes in ambient temperature, and means for providing reproduced color video signals by mixing the luminance signals from said second separating means and the carrier chrominance signals from said reconverting means.

* * * * *